United States Patent
Chern et al.

(10) Patent No.: US 9,444,379 B2
(45) Date of Patent: Sep. 13, 2016

(54) WIND POWER EXCITATION SYNCHRONOUS GENERATION SYSTEM HAVING MAXIMUM POWER DETERMINING UNIT AND CONTROL METHOD THEREOF

(71) Applicant: National Sun Yat-sen University, Kaohsiung (TW)

(72) Inventors: Tzuen-Lih Chern, Kaohsiung (TW); Der-Min Tsay, Kaohsiung (TW); Jao-Hwa Kuang, Kaohsiung (TW); Guan-Shyong Hwang, Kaohsiung (TW); Li-Hsiang Liu, Kaohsiung (TW); Wei-Ting Chen, Kaohsiung (TW); Ping-Lung Pan, Kaohsiung (TW); Tsung-Mou Huang, Kaohsiung (TW)

(73) Assignee: NATIONAL SUN YAT-SEN UNIVERSITY, Kaohsiung (TW)

(*) Notice: Subject to any disclaimer, the term of this patent is extended or adjusted under 35 U.S.C. 154(b) by 0 days.

(21) Appl. No.: 14/731,189

(22) Filed: Jun. 4, 2015

(65) Prior Publication Data
US 2015/0270798 A1 Sep. 24, 2015

Related U.S. Application Data

(63) Continuation-in-part of application No. 13/345,706, filed on Jan. 7, 2012, now abandoned.

(30) Foreign Application Priority Data

Jul. 29, 2011 (TW) .............................. 100127128 A

(51) Int. Cl.
*H02P 9/04* (2006.01)
*H02P 9/06* (2006.01)
(Continued)

(52) U.S. Cl.
CPC ................. *H02P 9/06* (2013.01); *F03D 9/003* (2013.01); *H02P 9/305* (2013.01); *H02P 9/48* (2013.01); *H02P 2101/10* (2015.01); *H02P 2101/15* (2015.01); *Y02E 10/725* (2013.01)

(58) Field of Classification Search
CPC ............... F03D 9/003; H02P 2101/10; H02P 2101/15; H02P 9/06; H02P 9/305; H02P 9/48; Y02E 10/725
See application file for complete search history.

(56) References Cited

U.S. PATENT DOCUMENTS 5,418,446 A  5/1995  Hallidy
5,476,293 A  12/1995  Yang
(Continued)

FOREIGN PATENT DOCUMENTS

CN   1107265 A   8/1995
CN   1270659 A   10/2000
(Continued)

OTHER PUBLICATIONS

Excitation Synchronous Wind Power Generators With Maximum Power Tracking Scheme.

*Primary Examiner* — Tulsidas C Patel
*Assistant Examiner* — S. Milkailoff

(57) ABSTRACT

A wind power excitation synchronous generation system having a maximum power determining unit and a control method thereof are disclosed. In this control method, dual input shafts and a single output shaft of a gear transmission mechanism are used, and two kinds of inputted power, such as wind power and servo motor control power, are integrated, so as to allow the output shaft to drive an excitation synchronous generator to generate electric power. In this system, a rotation speed and a phase of a servo motor are controlled, so as to allow the excitation synchronous generator to output the electric power with a frequency and a phase identical to the utility grid.

2 Claims, 3 Drawing Sheets

(51) Int. Cl.
*F03D 9/00* (2016.01)
*H02P 9/30* (2006.01)
*H02P 9/48* (2006.01)
*H02P 101/10* (2015.01)
*H02P 101/15* (2015.01)

(56) References Cited

U.S. PATENT DOCUMENTS

| | | |
|---|---|---|
| 5,796,231 A | 8/1998 | Kyodo |
| 7,095,131 B2 | 8/2006 | Mikhail et al. |
| 7,728,537 B2 | 6/2010 | Tomigashi |
| 7,733,066 B2 | 6/2010 | Ichinose et al. |
| 7,915,748 B2 | 3/2011 | Storm et al. |
| 2008/0066569 A1 | 3/2008 | Henenberger |
| 2010/0314873 A1 | 12/2010 | Stone |

FOREIGN PATENT DOCUMENTS

| | | |
|---|---|---|
| CN | 1065690 C | 5/2001 |
| CN | 1905355 A | 1/2007 |
| CN | 101101324 A | 1/2008 |
| CN | 101145754 A | 3/2008 |
| CN | 101815628 A | 8/2010 |
| EP | 0700596 B1 | 10/2000 |
| JP | 06200864 A | 7/1994 |
| JP | 07245997 A | 9/1995 |
| JP | 2007037276 A | 2/2007 |
| JP | 2010533473 A | 10/2010 |
| TW | 265485 B | 12/1995 |
| TW | 201102781 A | 1/2011 |

WIND POWER EXCITATION SYNCHRONOUS GENERATION SYSTEM HAVING MAXIMUM POWER DETERMINING UNIT AND CONTROL METHOD THEREOF

CROSS REFERENCE TO RELATED APPLICATIONS

This application is a continuation-in-part application of U.S. patent application Ser. No. 13/345,706, filed on Jan. 7, 2012, the disclosure of which is incorporated herein by reference.

FIELD OF THE INVENTION

The present invention relates to a wind power excitation synchronous generation system and a control method thereof, and more particularly, to a control method for driving the generator at a constant speed, stable voltage, frequency, and a phase equal to the utility grid by using a motor servo control and an excitation current control of the excitation synchronous generator.

BACKGROUND OF THE INVENTION

Generally, in a wind power generation system with a permanent magnet generator or an induction generator, a wind power is transmitted by using a transmission mechanism to transmit a rotational power to a generator. A rotation speed and a torque of the generator are determined according to the magnitude of the wind power. Therefore, the rotation speed thereof is required to be limited for ensuring that the rotation speed varies in a specific range. When the wind power is higher or lower than a standard range, the generator is turned off until the wind power is in the standard range. In this passive power generation system, an AC-to-DC converter and a DC-to-AC converter are required to output the wind power. However, this converting method will result in a power loss of the power conversion, hence deteriorating a power conversion efficiency and increasing the cost of the generation equipment.

Besides, in the induction wind generator, when the inputted power is altered, or when the load of the utility grid is raised, the induction generator cannot control the excitation current thereof. Thus, when the power required for a load terminal is increased, a voltage from an output terminal of the generator cannot be constant, resulting in a reduction of an output power quality.

SUMMARY OF THE INVENTION

Therefore, an aspect of the present invention is to provide a control method of an excitation synchronous generator for maximum power tracking. With use of a motor servo control and an excitation current control of the excitation synchronous generator, a rotation speed of a transmission mechanism can be adjusted. When an input rotation speed is too high or low due to a variation of a power source, such as a wind power, the motor servo control is used, so as to allow the transmission mechanism to rotate at a constant rotation speed, and to control the phase thereof. Therefore, the excitation synchronous generator can be rotated at a constant speed for stably outputting power with a frequency and a phase. Moreover, a maximum power determining unit can integrate an reference wind power and a fine-tuning power for determining a power command, and can feed back an output power of the synchronous generator for generating an excitation current command to control an output voltage and a current of the excitation synchronous generator, so as to allow the excitation synchronous generator to obtain the maximum power.

In the present invention, with use of the motor servo control for frequency stabilization and an excitation current control of the excitation synchronous generator for maximum power tracking, when the wind power of the power generation system varies, the output of the transmission mechanism can be stabilized for controlling the voltage, frequency and phase thereof. Furthermore, by using a power feedback and an excitation current control, the power generation system can generate the maximum power to a utility grid.

According to a preferred embodiment of the present invention, the control method of the wind power excitation synchronous generation system comprises the following steps: detecting an output voltage, a current and a power of the excitation synchronous generator; controlling an excitation current of the excitation synchronous generator according to the output voltage, the current and the power, so as to allow the excitation synchronous generator to output a power to a utility grid; and performing a servo control of a motor according to an information of an encoder, so as to allow a transmission mechanism to drive the excitation synchronous generator at a predetermined speed, thereby generating a three-phase alternating-current (AC) power supply with a phase equal to the utility grid, wherein the three-phase AC power supply is allowed to be connected to the utility grid in parallel.

According to another embodiment of the present invention, the wind power excitation synchronous generation system comprises: a wind turbine rotor; an excitation synchronous generator; a transmission mechanism configured to use the wind turbine rotor to drive the excitation synchronous generator; an excitation controlling unit configured to provide an excitation current signal to the excitation synchronous generator, so as to allow the excitation synchronous generator to output an output power to the utility grid; a motor configured to drive the transmission mechanism; a digital signal processing controller configured to determine a duty cycle width of a pulse width modulation (PWM) controlling unit according to a phase information of the utility grid and a position information of an armature of the excitation synchronous generator; and a power driving inverter configured to receive a power switch timing transmitted form the PWM controlling unit for driving the motor.

According to a preferred embodiment of the present invention, a control method of a wind power excitation synchronous generation system for generating power from a wind power comprises the following steps of:

detecting an output voltage, an output current and an output power of an excitation synchronous generator by using a power detector, so that a real-time output power information is obtained;

using a motor to control a driving of a transmission mechanism, wherein the transmission mechanism is connected between a wind turbine rotor and the excitation synchronous generator for using the wind turbine rotor to drive the excitation synchronous generator;

using an encoder to transmits a position information of the excitation synchronous generator to a digital signal processing controller; using a phase detector to obtain and transmit a phase information of a utility grid to the digital signal processing controller;

transferring the phase information of the utility grid into a present position command;

comparing the present position command with the position information of the excitation synchronous generator to determine a duty cycle width of a PWM controlling unit, and to output a power switch timing to a power driving inverter for driving the motor;

performing a position servo control of the motor according to the position information of the excitation synchronous generator from the encoder, so as to allow the transmission mechanism to drive the excitation synchronous generator at a predetermined speed, thereby generating the output power;

transmitting the output power to the utility grid in parallel;

using a maximum power determining unit to generate a power command according to a sum of a reference wind power and a fine-tuning power, wherein the reference wind power is defined by a pitch angle of the wind turbine rotor and a reference wind speed, and the fine-tuning power is defined as a function of a motor input power; and tracking a predetermined power of the power generation system by the power command;

wherein the real-time output power information is fed back to a power controller to compare with the power command, and the power controller is used for generating an excitation current command to an excitation controlling unit, and the excitation controlling unit is used for generating the excitation current for controlling an excitation field of the excitation synchronous generator.

In one embodiment of the present invention, the control method further comprises the following steps: when the wind power decreases, the motor input power is a positive compensatory power for maintaining the excitation synchronous generator at the predetermined speed, and simultaneously adjusting an excitation controlling unit for reducing the excitation current to ensure that the excitation synchronous generator fully absorbs the wind power and converts the wind power into the utility grid, hence reducing a power consumption which is used to drive the excitation synchronous generator by the motor.

In one embodiment of the present invention, the control method further comprises the following steps: when the wind power increases, the motor input power is a negative compensatory power for maintaining the excitation synchronous generator at the predetermined speed, and simultaneously adjusting an excitation controlling unit for raising the excitation current to ensure that the excitation synchronous generator fully absorbs the wind power, and converts the wind power into the utility grid, hence reducing a power consumption which is used to drive the excitation synchronous generator by the motor.

According to a preferred embodiment of the present invention, a wind power excitation synchronous generation system, comprises:

a wind turbine rotor;

an excitation synchronous generator;

a transmission mechanism connected between the wind turbine rotor and the excitation synchronous generator to drive the excitation synchronous generator;

an excitation controlling unit configured to provide an excitation current to the excitation synchronous generator, so as to allow the excitation synchronous generator to output an output power to a utility grid;

a motor configured to drive the transmission mechanism;

a digital signal processing controller configured to determine a duty cycle width of a pulse width modulation (PWM) controlling unit according to a phase information of the utility grid and a position information of an armature of the excitation synchronous generator, wherein the duty cycle width is determined by comparing the phase information of the utility grid and the position information of the armature of the excitation synchronous generator; and a power driving inverter configured to receive a power switch timing transmitted from the PWM controlling unit so as to drive the motor, wherein the power switch timing is determined according to the duty cycle width of the PWM controlling unit;

a maximum power determining unit configured to generate a power command determined by a sum of a reference wind power and a fine-tuning power, wherein the reference wind power is defined by a pitch angle of the wind turbine rotor and a reference wind speed, and the fine-tuning power is defined as a function of a motor input power, wherein the power command is provided to the excitation synchronous generator so that the excitation current is controlled and applied to the excitation synchronous generator to track the output power; and an encoder configured to transmit the position information of the armature of the excitation synchronous generator to the digital signal processing controller;

a power detector configured to obtain the output power of the excitation synchronous generator and to generate a real-time output power information, wherein the real-time output power information is fed back and compared with the power command; and a power controller configured to generate an excitation current command to the excitation controlling unit for generating the excitation current.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
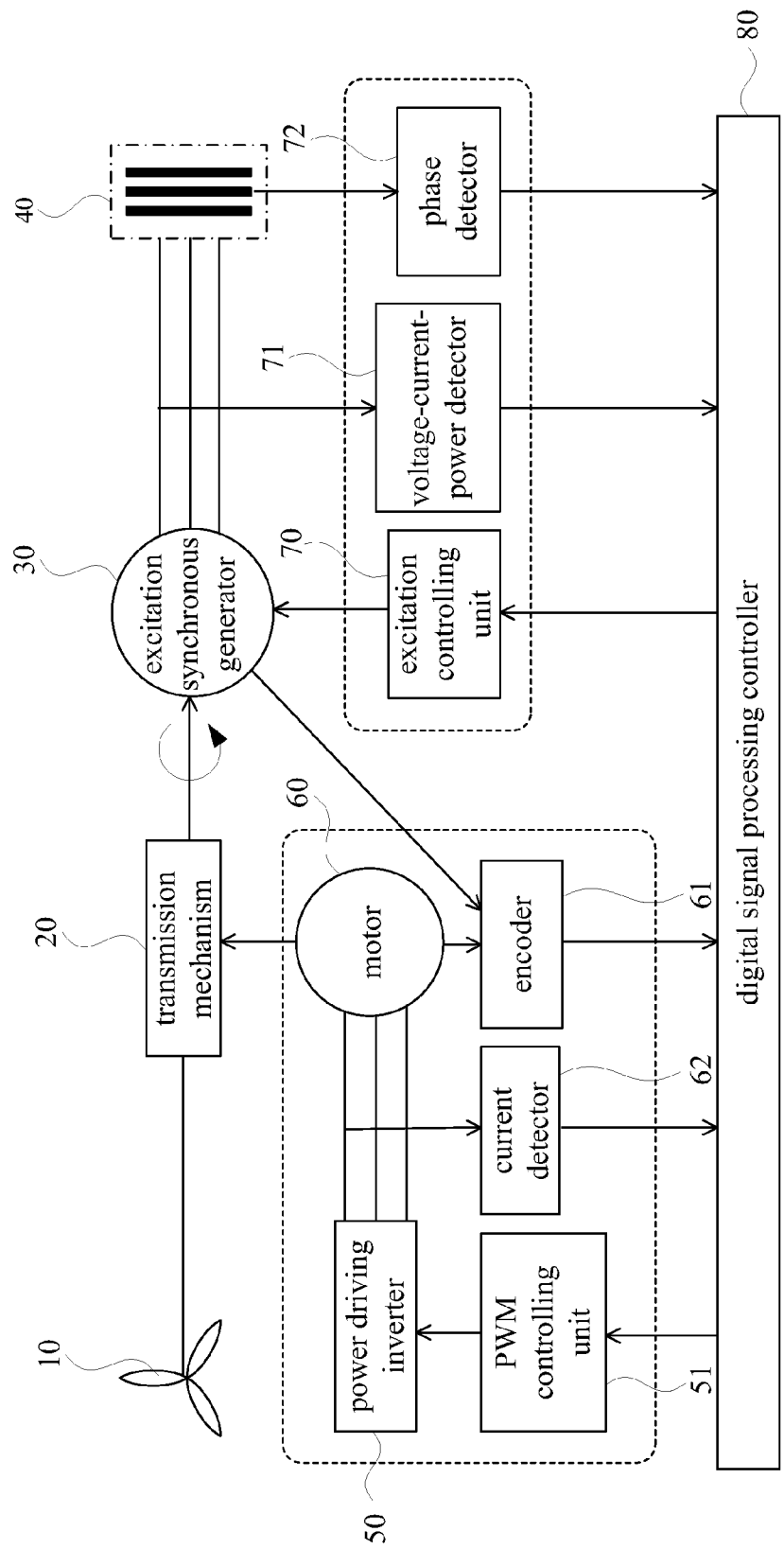
FIG. 1 is a schematic diagram showing a system using the control method of a wind power excitation synchronous generation system according to one embodiment of the present invention.
Figure 2:
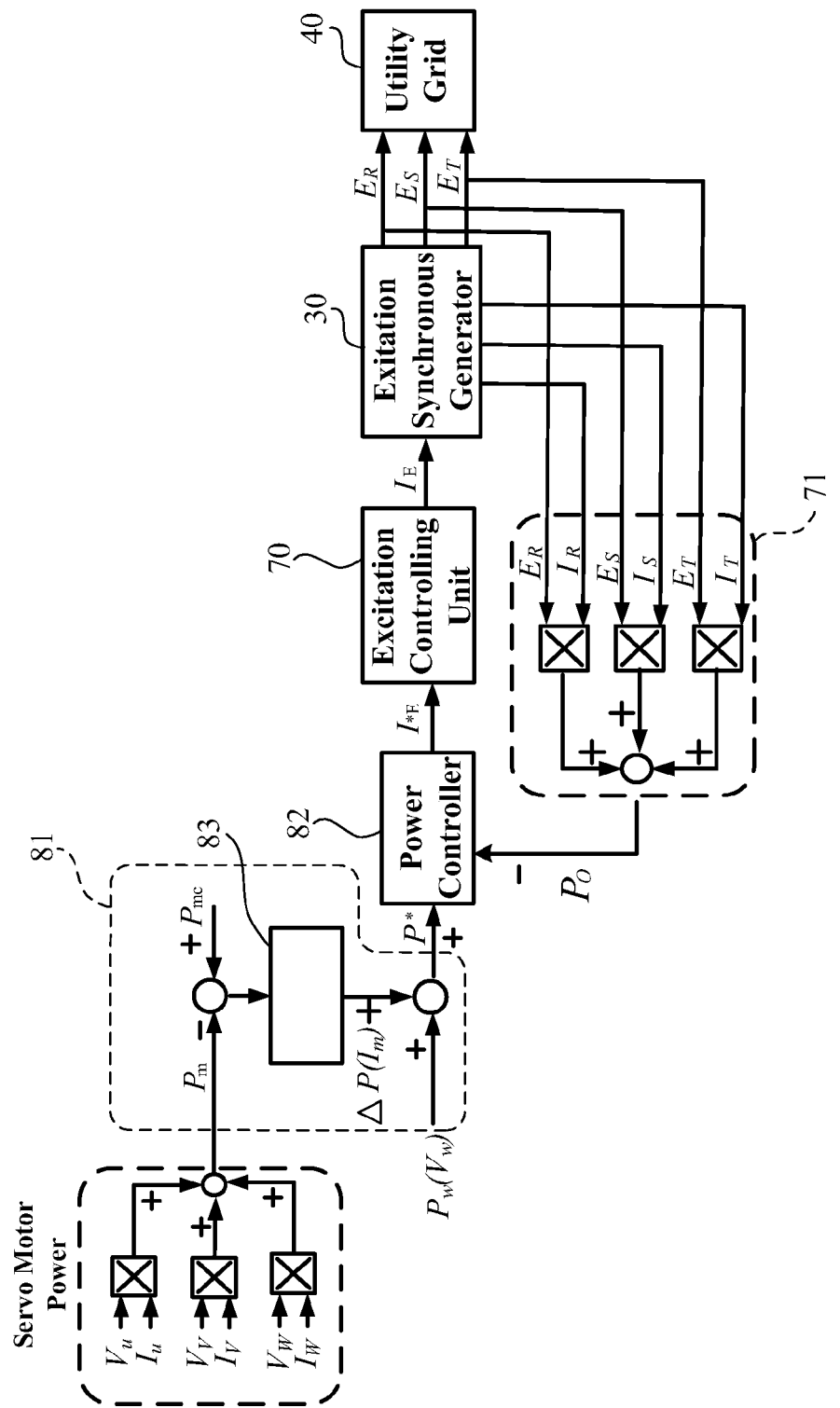
FIG. 2 is a block diagram showing the control method of a wind power excitation synchronous generation system according to the embodiment of the present invention.
Figure 3:
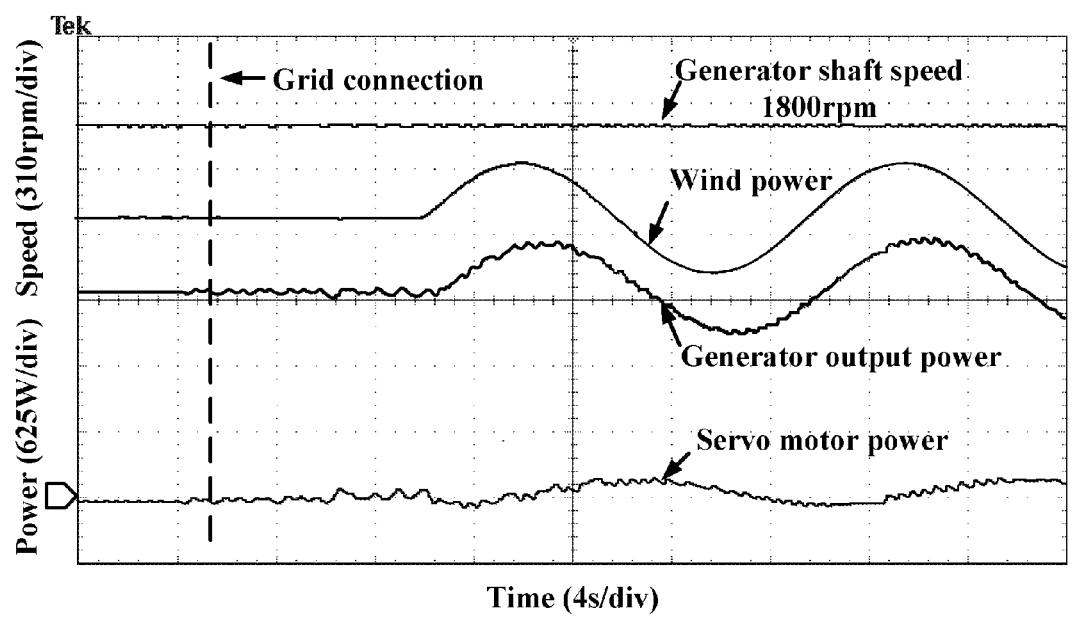
FIG. 3 shows the experimental results according to the embodiment of the present invention, wherein the mark "" on Y axis points out the base line for both of the speed and the power.

In order to make the illustration of the present invention more explicit and complete, the following description is stated with reference to FIG. 1 through FIG. 3.

In the drawings, like reference numerals indicate like components or items.

Referring to FIG. 1, a schematic diagram showing a system using the control method of a wind power excitation synchronous generation system according to an embodiment of the present invention is illustrated. The method of the present invention can be applicable to a wind power generation system which is described below. However, the method may be applicable to other power systems, such as waterpower, firepower and tidal power system, but not limited to the above description. The present invention can be used for a control technique of a renewable energy relating to any power generation systems.

Referring to FIG. 1 again, the generation system of the present invention comprises a wind turbine rotor 10, a transmission mechanism 20, an excitation synchronous generator 30, a utility grid 40, a power driving inverter 50, a pulse width modulation (PWM) controlling unit 51, a motor 60, an encoder 61, a current detector 62, a excitation controlling unit 70, a voltage-current-power detector 71, a phase detector 72 and a digital signal processing controller 80.

Referring to FIG. 1 again, when the wind power is inputted into the wind turbine rotor 10, the transmission mechanism 20 drives the excitation synchronous generator 30 to work by the inputted wind power. The excitation controlling unit 70 provides an excitation current, so as to allow the excitation synchronous generator 30 to generate an electrical power and output the electrical power to the utility grid 40.

Referring to FIG. 1 again, the encoder 61 transmits a position information of the excitation synchronous generator 30 to the digital signal processing controller 80. The phase detector 72 obtains a phase information of the utility grid and transmit the phase information to the digital signal processing controller 80. The phase information is transferred into a present position command by the digital signal processing controller 80, wherein the present position command is used for comparing with the position information of an armature of the excitation synchronous generator 30, so as to determine a duty cycle width of the PWM controlling unit 51, and to output a power switch timing to the power driving inverter 50 for driving the motor 60. With use of the position servo control of the motor, the transmission mechanism 20 can drive the excitation synchronous generator 30 at a constant speed. Therefore, the frequency of the voltage outputted by the generator 30 can be stable, and the phase of the outputted voltage is equal to the utility grid. When the excitation synchronous generator 30 works, a signal fed from the voltage-current-power detector 71 is used to detect the output voltage, output current and output power of the excitation synchronous generator 30. According to an information of the voltage-current-power detector 71, the digital signal processing controller 80 can provide an excitation current control to the excitation controlling unit 70 for adjusting an excitation current of the generator, so as to allow the generator to output a constant voltage and current.

Referring to FIG. 1 again, when the wind power inputted into the wind turbine rotor 10 decreases, and the rotation speed of the transmission mechanism 20 slows down, for maintaining the rotation speed thereof, the digital signal processing controller 80 can adjust the PWM controlling unit 51 according to the information of the encoder 61 and the current detector 62, so as to adjust a duty cycle of the motor and drive the motor 60 to follow the position command which is fed back by the phase detector 72 for reducing the position error and maintaining the excitation synchronous generator 30 at a constant rotation speed. At the same time, the digital signal processing controller 80 can adjust the excitation current provided by the excitation controlling unit 70 for reducing the excitation current to the generator.

Referring to FIG. 1 again, when the wind power inputted into the wind turbine rotor 10 increases, and the rotation speed of the transmission mechanism 20 speeds up, for maintaining the rotation speed thereof, the digital signal processing controller 80 can adjust the PWM controlling unit 51 according to the information of the encoder 61 and the current detector 62, so as to adjust the duty cycle of the motor and drive the motor 60 to follow the position command which is fed back by the phase detector 72 for reducing the position error and maintaining the excitation synchronous generator 30 at a constant rotation speed. At the same time, the digital signal processing controller 80 can adjust the excitation current provided by the excitation controlling unit 70 for raising the excitation current to the generator.

Referring to FIG. 2, the power generation system further comprises a maximum power determining unit 81 which is used to determine a predetermined power of the power generation system according to a reference wind power $P_W(V_W)$ and a fine-tuning power $\Delta P(I_m)$, i.e. $P_W(V_W)+\Delta P(I_m)$. The reference wind power $P_W(V_W)$ is determined according to a wind speed ($V_W$). For raising the efficiency of the power generation system, the outputted power thereof is required to follow the wind power, and it is also required to reduce the power used by the motor, so as to achieve a constant speed control. Therefore, a motor input current ($I_m$) comprising three-phase currents $I_u$, $I_v$, and $I_w$ is detected to obtain a motor input power $P_m$, and a motor command $P_{mc}$ is used for comparing with the motor input power $P_m$ to determine the fine tuning power $\Delta P(I_m)$ through a proportional-integral controller 83 (PI controller). Preferably, the motor command $P_{mc}$ is zero, therefore, the fine tuning power $\Delta P(I_m)$ can be determined directly according to the motor input power $P_m$, i.e. the motor input current ($I_m$). A power command P* for tracking the predetermined power is provided to the generator according to the sum of the reference wind power $P_W(V_W)$ and the motor fine tuning power $\Delta P(I_m)$.

Referring to FIG. 2 again, the power command P* is generated by the maximum power determining unit 81. The maximum power determining unit 81 uses the power detector 71 to obtain three-phase voltages ($E_R$, $E_S$, $E_T$), and currents ($I_R$, $I_S$, $I_T$) of the excitation synchronous generator 30 and generate a real-time output power information $P_O$ from the output terminal of the excitation synchronous generator 30, and feeds back this information $P_O$ to a power controller 82 to compare with the power command P*. The power controller 82 can generate an excitation current command $I_E^*$ to the excitation controlling unit 70 according to the real-time output power information $P_O$ and the power command P*, and thus the excitation controlling unit 70 can generate an excitation current $I_E$ for controlling an excitation field of the excitation synchronous generator 30, and the excitation current $I_E$ can be controlled to generate the predetermined power to the utility grid 40.

Furthermore, when the wind power decreases, the motor input power $P_m$ is a positive compensatory power for maintaining the excitation synchronous generator 30 at the predetermined speed, and simultaneously adjusting the excitation controlling unit 70 for reducing the excitation current $I_E$ to ensure that the excitation synchronous generator 30 fully absorbs the wind power and converts the wind power into the utility grid 40, hence reducing a power consumption which is used to drive the excitation synchronous generator 30 by the motor 60.

In addition, when the wind power increases, the motor input power $P_m$ is a negative compensatory power for maintaining the excitation synchronous generator 30 at the predetermined speed, and simultaneously adjusting the excitation controlling unit 70 for raising the excitation current $I_E$ to ensure that the excitation synchronous generator 30 fully absorbs the wind power, and converts the wind power into the utility grid 40, hence reducing a power consumption which is used to drive the excitation synchronous generator 30 by the motor 60.

Referring to FIG. 3, which shows the experimental results for demonstrating the wind power excitation synchronous generation system and the control method according to the embodiment of the present invention. The system is assumed to have a stable wind power of 2500 W in the time period beginning in FIG. 3. However, the measured generator power output is only 2000 W. The generator output power is about 500 W less than the wind power, which is mainly due to the power consumptions of mechanical friction and moment of inertia at rotation speed of 1800 rpm, and the partial power loss comes from power conversion efficiency of the generator. According to FIG. 3, the wind is sine wave change; the system converts the wind power into electricity. A slight amount of power provided by the servo motor can maintain the generator shaft speed constantly (1800 rpm) and achieve excellent power quality.

In a natural environment, the wind power varies with time. In order to stabilize the output voltage, output current and output power of the generator, the output power thereof has to track the input power variation and react immediately by adjusting the excitation current. The present invention provides a wind power excitation synchronous generation system having a maximum power determining unit and a control method thereof can minimize the consumption of the servo motor power, and most of the input power (wind power) can be transferred to the utility grid by the generator, as shown in FIG. 3.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A control method of a wind power excitation synchronous generation system, wherein the control method comprises the following steps of:
   detecting an output voltage, an output current and an output power of an excitation synchronous generator by using a power detector, so that a real-time output power information is obtained;
   using a motor to control a driving of a transmission mechanism, wherein the transmission mechanism is connected between a wind turbine rotor and the excitation synchronous generator to drive the excitation synchronous generator;
   using an encoder to transmits a position information of the excitation synchronous generator to a digital signal processing controller;
   using a phase detector to obtain and transmit a phase information of a utility grid to the digital signal processing controller;
   transferring the phase information of the utility grid into a present position command;
   comparing the present position command with the position information of the excitation synchronous generator to determine a duty cycle width of a pulse width modulation controlling unit, and to output a power switch timing to a power driving inverter for driving the motor;
   performing a position servo control of the motor according to the position information of the excitation synchronous generator, so as to allow the transmission mechanism to drive the excitation synchronous generator at a predetermined speed, thereby generating the output power;
   transmitting the output power to the utility grid in parallel;
   using a maximum power determining unit to generate a power command according to a sum of a reference wind power and a fine-tuning power, wherein the reference wind power is defined by a pitch angle of the wind turbine rotor and a reference wind speed, and the fine-tuning power is defined as a function of a motor input power;
   tracking a predetermined power of the power generation system by the power command;
   wherein the real-time output power information is fed back to a power controller to compare with the power command, and the power controller is used for generating an excitation current command to an excitation controlling unit, and the excitation controlling unit is used for generating an excitation current for controlling an excitation field of the excitation synchronous generator.

2. A wind power excitation synchronous generation system, comprising:
   a wind turbine rotor;
   an excitation synchronous generator;
   a transmission mechanism connected between the wind turbine rotor and the excitation synchronous generator to drive the excitation synchronous generator;
   an excitation controlling unit configured to provide an excitation current to the excitation synchronous generator, so as to allow the excitation synchronous generator to output an output power to a utility grid;
   a motor configured to drive the transmission mechanism;
   a digital signal processing controller configured to determine a duty cycle width of a pulse width modulation controlling unit according to a phase information of the utility grid and a position information of an armature of the excitation synchronous generator, wherein the duty cycle width is determined by comparing the phase information of the utility grid and the position information of the armature of the excitation synchronous generator; and
   a power driving inverter configured to receive a power switch timing transmitted from the pulse width modulation controlling unit so as to drive the motor, wherein the power switch timing is determined according to the duty cycle width of the pulse width modulation controlling unit;
   a maximum power determining unit configured to generate a power command determined by a sum of a reference wind power and a fine-tuning power, wherein the reference wind power is defined by a pitch angle of the wind turbine rotor and a reference wind speed, and the fine-tuning power is defined as a function of a motor input power, wherein the power command is provided to the excitation synchronous generator so that the excitation current is controlled and applied to the excitation synchronous generator to track the output power; an encoder
   configured to transmit the position information of the armature of the excitation synchronous generator to the digital signal processing controller;
   a power detector configured to obtain the output power of the excitation synchronous generator and to generate a real-time output power information, wherein the real-time output power information is fed back and compared with the power command; and a power controller configured to generate an excitation current command to the excitation controlling unit for generating the excitation current.

\* \* \* \* \*